Oct. 25, 1927.

E. L. BRENK 1,646,609

SOCKET

Filed April 27, 1923     3 Sheets-Sheet 1

Inventor:
Ernest L. Brenk,
by Wm. F. Freudenreich,
Atty.

Oct. 25, 1927.
E. L. BRENK
SOCKET
Filed April 27, 1923
1,646,609
3 Sheets-Sheet 2
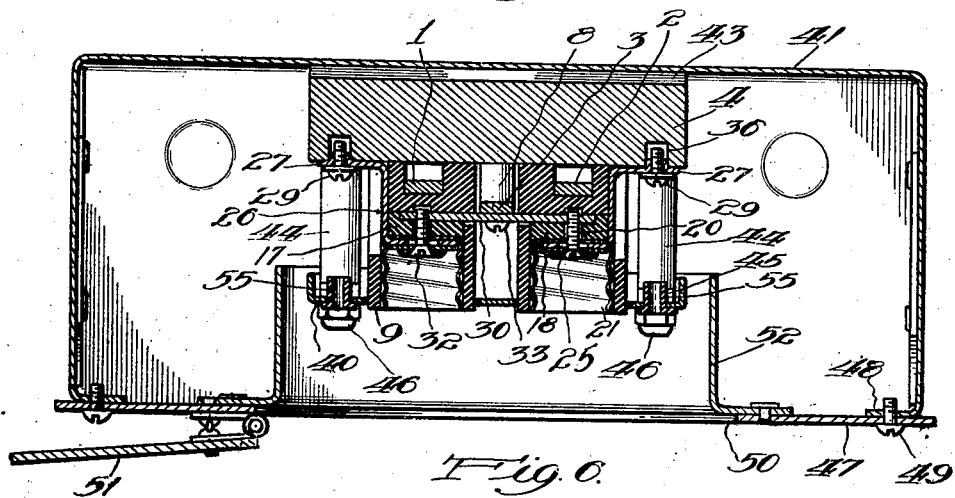
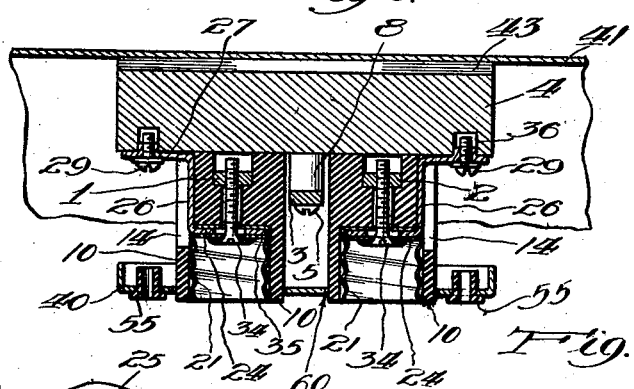
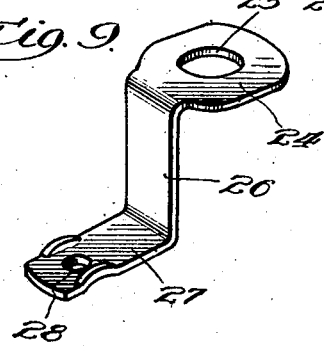
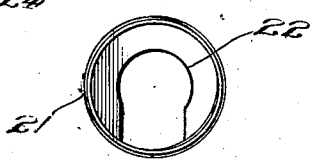
Inventor:
Ernest L. Brenk,
by Wm F Freudenreich,
Atty Oct. 25, 1927.

E. L. BRENK 1,646,609

SOCKET

Filed April 27, 1923   3 Sheets-Sheet 3

Inventor:
Ernest L. Brenk,
by Wm. F. Freudenreich
Atty.

Patented Oct. 25, 1927.

1,646,609

UNITED STATES PATENT OFFICE.

ERNEST L. BRENK, OF CICERO, ILLINOIS.

SOCKET.

Application filed April 27, 1923. Serial No. 634,984.

The present invention relates particularly to sockets for use in panel boards or cut-out panels which are the centers from which electrical energy is distributed to light and power feeders, and has for its object to produce a simple and novel construction which will permit such devices to be made extremely compact, which will permit quick and easy assembly of the parts, ready repair of any damaged element without disturbing other elements, and make inspection easy and safe.

Figure 1:
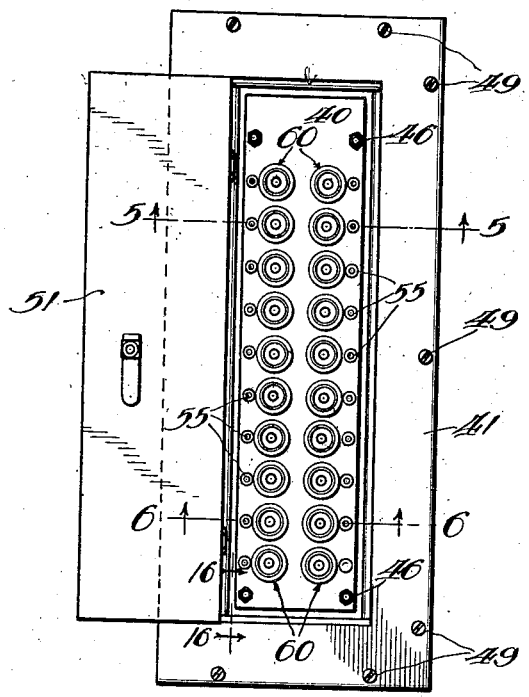
Figure 3:
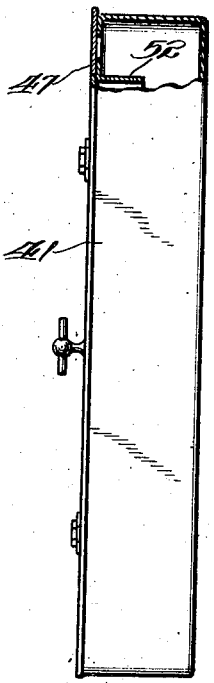
Figure 2:
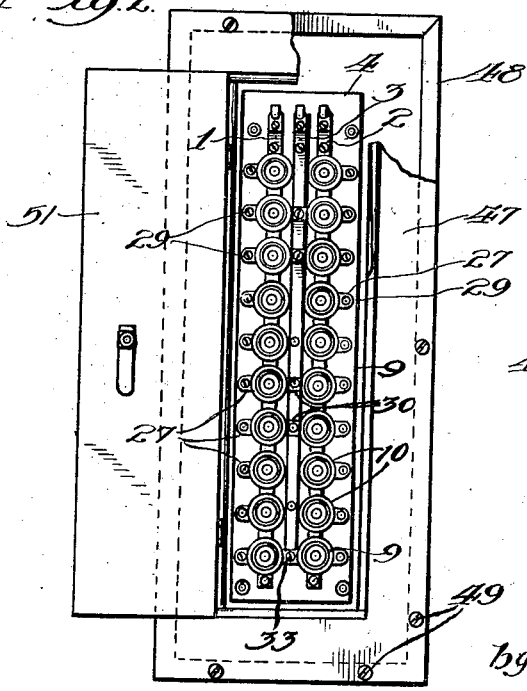
Figure 4:
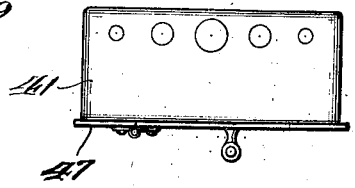
Figure 10:
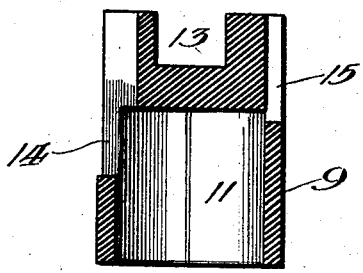
Figure 14:
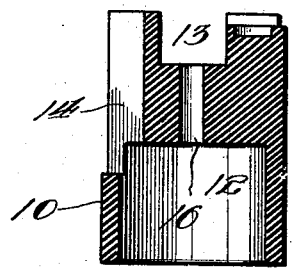
Figures 11, 15:
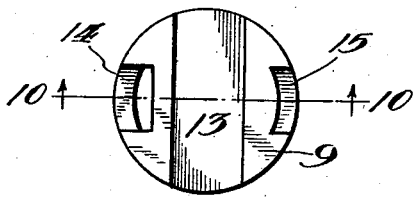
Figure 13:
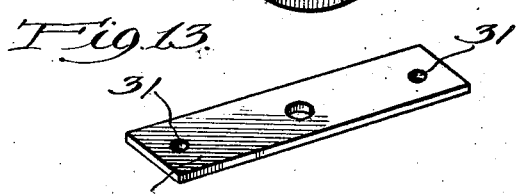
Figure 12:
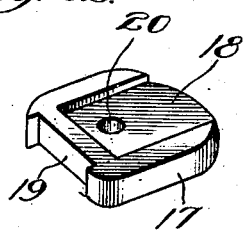
Figure 16:
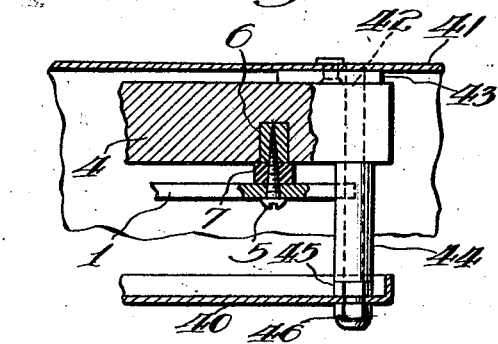

The various features of novelty whereby my invention is characterized will hereinafter be pointed out with particularity in the claims; but for a full understanding of my invention and of its objects and advantages, reference may be had to the following detailed description taken in connection with the accompanying drawings, wherein:

Figure 1 is a front view of a protected type of panel board or cut-out panel embodying my invention, the door being shown open; Fig. 2 is a view similar to Fig. 1, the cover for the panel being removed and a fragment of the front wall of the casing being broken away; Fig. 3 is a side elevation of the device, the door of the casing being closed and a fragment of the side wall of the casing, at one end thereof, being broken away; Fig. 4 is an end view of the device, the door being closed; Fig. 5 is a section on an enlarged scale taken on line 5—5 of Fig. 1; Fig. 6 is a section similar to Fig. 5 taken on line 6—6 of Fig. 1, only a fragment of the casing being shown; Figs. 7 and 8 are respectively an end view and a side view of one of the screw shells forming part of a fuse receptacle; Fig. 9 is a perspective view of one of the terminal straps forming part of each fuse receptacle; Figs. 10 and 11 are respectively a central longitudinal section through and an end view of one of the insulating cups forming part of a fuse receptacle adapted for attachment to the neutral bus bar; Fig. 12 is a perspective view of a detachable insulating block adapted to be placed in and form part of the cup shown in Figs. 10 and 11; Fig. 13 is a perspective view of one of the cross pieces for connecting two fuse receptacles to the neutral bus bar; Figs. 14 and 15 are views similar to Figs. 10 and 11 illustrating the cup forming part of the fuse receptacles attached to the outermost bus bars; and Fig. 16 is a section, on an enlarged scale, taken approximately on line 16—16 of Fig. 1, illustrating the means for fastening the bus bars to the base and for fastening the base to the casing and the cover to the base.

In the drawings I have illustrated only a single form of my invention and, for the sake of brevity I shall confine the detailed description to this particular form; although it will of course be understood that the present invention is not limited to the specific construction and arrangement thus shown.

Referring to the drawings, 1, 2 and 3 represent three bars of conducting material, namely, bus bars, which may conveniently be rectangular in cross section. 4 is a base of insulating material on which the bus bars are mounted in parallel relation to each other. Each bar is secured to the base independently of the others, conveniently by means of screws 5, as best shown in Fig. 16, passing downwardly through the same and to suitable expansion plugs 6 in the base. The bars are spaced apart from the base by means of bushings 7 arranged between them and the base, the bushings preferably surrounding the attaching screws. The bars 1 and 2 lie nearer the base than the intermediate bar 3, so that the bushings 8, best shown in Figs. 5 and 6, between this latter bar and the base, are shorter than the spacers between the other bars and the base.

Arranged over each of the bars 1 and 2 is a series of fuse receptacles. Each fuse receptacle comprises a cylindrical cup of insulating material, there being two kinds of cups, differing slightly from each other. Thus the cup 9 shown in Figs. 10 and 11, while of the same length and diameter as the cup 10 shown in Figs. 14 and 15, contains a chamber 11 which is deeper than the chamber 12 in the latter cup. Each cup has in the bottom face thereof a deep notch 13 of the same width as one of the bus bars and of such a depth that when the cups are placed on the two outside bars, with the bars lying in the grooves, the cups may rest against the face of the base member, as shown in Figs. 5 and 6. Each of the cups has in one side thereof, displaced ninety degrees with respect to the groove 13, a longitudinal groove 14 cut to such a depth that the inner end thereof communicates with the chamber within the cup. The cups 9 also have in the side, diametrically opposite the groove 14, a second groove 15 extending from the bottom end of the cup to a point somewhat beyond the bottom of the chamber 11; the depth of the groove 15 being at least as great as the thickness of the wall of the chambered portion of the cup, so that the inner end of this groove also communicates with the chamber in the cup. Each cup 10 has a hole 16 extending longitudinally through the thick bottom wall thereof at the axis. A block of insulating material 17, best shown in Fig. 12, is laid in the cup 9 so as to make the effective depth of the chamber 11 in this cup the same as that of the chamber 12 in the other form of cup; the block 17 forming a part of the cup 9 but being made separate therefrom for convenience in manufacture. In what is the under or inner side of the block 17 is a shallow recess 18 opening out through one edge of the block; this recess forming a shallow chamber between the block and the main bottom wall of the cup, which chamber communicates with the upper end of the groove 15. In the edge of the block 17 opposite that out of which the recess 18 opens, is a wide groove 19 adapted to form a continuation of that portion of the groove 14 lying below the bottom of the chamber 11. The block 17 has a central hole 20 through the same.

Associated with each cup is a screw shell 21 of conducting material having in the bottom thereof a central hole 22 of comparatively large diameter and having in the side, directly above the bottom, a hole 23 of approximately the same width as the groove 14 in the cup. These shells are simply dropped into the cups, being a sufficiently loose fit therein to permit them to be entered and removed easily; the block 17 being inserted in the cups 9 before the screw sleeves are placed in position.

Associated with each cup is a wire terminal strap. These straps are preferably made of flat pieces of metal bent into the form of a Z; one of the flanges, 24, as best shown in Fig. 9, being preferably given such a shape that it may be fitted easily into one of the screw shells and substantially cover the bottom of the latter. In the middle of the flange 24 is a compartively large hole 25. The web 26 and the second flange 27 of the strap are preferably made of approximately the same width as the grooves 14 in the cups; the length of the web being substantially equal to the length of such grooves. The flange 27 has a screw hole 28 to receive a terminal screw such as indicated at 29 in Figs. 5 and 6.

The parts are so proportioned that after a screw sleeve has been assembled in one of the cups, with the hole 23 registering with the inner end of the groove 14, the terminal strap may be applied by first inserting the flange or end 27 into the cup and passing it out through the hole 23 and the adjacent portion of the groove 14 in the cup. After the flange 27 has been passed to the exterior of the cup, the movement of the strap is continued until the web portion 26 also lies on the outside of the cup and the portion 24 lies upon the bottom of the screw shell, as shown in Figs. 5 and 6. Not only does the part 24 of the strap lie against the bottom of the screw shell, but the part 26 lies within the groove 14 and the part 27 projects out at right angles to the axis of the cup and in the same plane as the bottom face of the latter.

The cups, screw shells and terminal straps are fastened together and to a bus bar element by suitable contact screws. The cups 9 are intended to be connected together in pairs, each cup overlying one of the two outer bus bars. The connection between the two cups of each pair is made by means of a flat connecting bar or plate 30 of such size and shape that its ends may be inserted into the shallow chambers formed in the under sides of the block 17, the bars or plates reaching these chambers through the inner ends of the grooves 15 in the cups. Each connecting bar has therein, near each end thereof, a screw hole 31, so positioned that when the parts are assembled, a contact screw 32 passing through the registering holes 25 and 22 in the terminal strap and in the bottom of the screw shell and through the hole 20 in the overlying block 17, will enter one of the screw holes in the corresponding bar 30 as best shown in Fig. 5. The connecting bars are of course made of such lengths that they will permit the cups of each connected pair to be placed over the two outermost bus bars, as shown in Fig. 5. The intermediate bus bar 3 is so located that when the parts are all assembled, the connecting bars 30 lie against the same and may be fastened thereto by means of suitable screws 33. The fuse receptacles of which the cups 10 form a part, are connected directly to the outermost bus bars by means of contact screws 34 passing through the terminal straps, the bottoms of the screw shells and the holes 16 in the bottoms of the cups, as best shown in Fig. 6. Each screw shell with its terminal strap forms one terminal of a fuse receptacle, while the contact screw which fastens the parts together and to a bus bar element, forms the other terminal. Consequently the contact screws must be insulated from the terminal straps and the screw shells. The holes 22 and 25 through which these screws pass are much larger in diameter than the shanks of the screws, while the heads of the screws are held out of metallic contact with the underlying terminal straps by means of washers 35 of insulating material lying between the heads of the screws and the terminal straps.

When the parts are all assembled on the base, it will be seen that the fuse receptacles are arranged in two rows above the bus bars 1 and 2, but rest against the base, which will resist any thrust due to screwing a fuse plug into one of the receptacles. Furthermore, the flanges or sections 27 of the terminal straps also rest against the base, which is preferably provided with pockets or recesses 36, into which the ends of the wire terminal screws 29 may project, so that the base will take the thrust of a screw driver employed to turn the wire terminal screws.

In building the panel each bus bar unit, comprising a bus bar and the fuse receptacles that are fixed to it, is assembled before any of the parts are fastened to the base. Then the two units containing the outer bus bars, 1 and 2, are screwed to the base and, after this has been done, the unit including the central bus bar, is placed in position; the bar lying between the other two while the fuse receptacles which it carries occupy places in the rows overlying the outer bars, although they are not attached to the outer bars in any way. It will thus be seen that any individual fuse receptacle that is fastened to one of the outer bars may be removed by simply unscrewing the corresponding contact screw which holds it to its bus bar, so that any damaged receptacle of this kind can be taken out and replaced without disturbing any other portion of the panel board. Similarly, any pair of cross-connected fuse receptacles may be removed by simply unscrewing the connecting bar from the central bus bar. Furthermore, the entire central bus bar unit may be removed without disturbing the other two units and without detaching any of its fuse receptacles therefrom; and, after the central unit has been removed, either or both of the other two units may be detached from the base independently of each other.

In order that all of the exposed metal parts, except those visible through the open ends of the cups, may be covered up, I have provided a cover 40, which may conveniently be made out of sheet metal, of about the same length and width as the base and provided with holes 41 through which the outer ends of the cups may project slightly. This cover may be supported on posts arranged at the four corners between it and the base, being held on the posts by means of nuts engaging the outer face of the cover; so that upon the removal of the nuts, the cover may be taken off. In the construction illustrated, the panel is housed in a box or casing 41, and the posts for securing the cover to the base may also conveniently be used for holding the base to the back wall or bottom of the case. A means for accomplishing this is shown in Fig. 16, where there is shown a post 42 in the form of a long screw passing through the base of the panel, and into or through a spacing strip 43 riveted to the comparatively thin wall of the case. Surrounding the post on the front side of the base is a sleeve 44, the outer end of which is engaged by a nut 45 on the post. It will be seen that when the nut 45 is screwed on it will clamp the sleeve and the base together between the nut and the spacing strip 43. The cover 40 is provided with holes adapted to receive the projecting ends of the posts, the cover being held in place by means of nuts 46 screwed on the extreme outer ends of the posts and clamping the cover between the same and the nuts 45.

The box or case illustrated is one containing within the same, beside the panel, ample room for all of the wires that may be associated with the panel. The case is therefore made wider, deeper and preferably longer than the panel, so as to leave comparatively large chambers in the sides and ends of the case. The front wall 47 of the case is preferably made detachable, being conveniently fastened to inwardly-turned flanges 48 on the side and end walls by means of screws 49. The front wall of the case has a door opening 50 only slightly longer and slightly wider than the panel and lying directly in front of and in registration with the latter. This opening may be closed by a suitable door 51. Around the door opening is an inwardly-directed continuous flange or skirt 52 wide enough to bring the inner edge past the plane of the front of the panel, so as to leave only a narrow opening between the sides and ends of the panel and the chambers for containing the wires. In this way, while access may be had to the terminal wire screws upon removing the cover plate 40, the bulk of the wire is kept housed, not only during ordinary working conditions, but also even after the cover plate has been removed. At the same time, however, complete access to the panel for inspection, repair, removal and replacement may be had without disturbing in any way the elements constituting the case and its closure.

When a fuse is blown it may be necessary to unscrew quite a number of fuse plugs before the defective one is located. This difficulty can be obviated by connecting a lamp or other indicating device across the wire terminal screws. When the cover plate 40 is in position, access cannot be had to the wire terminal screws unless special provision is made therefor. To this end I have placed in the cover plate directly above each of the wire terminal screws, a hole large enough to permit a small rod or other contact element to be inserted and brought into contact with the screw. Where the cover plate is made of metal, each hole preferably contains a sleeve or bushing 55 of insulating material, as best shown in Figs. 5 and 6. These sleeves or bushings prevent two contact pieces passing down through two of the holes in the cover plate from being short-circuited by means of the cover plate.

While I have illustrated and described with particularity only a single preferred form of my invention, I do not desire to be limited to the exact structural details thus illustrated and described; but intend to cover all forms and arrangements which come within the terms employed in the definitions of my invention constituting the appended claims.

I claim:

1. A device comprising a cup of insulating material having opposed openings in the sides, a strap lying in the cup on the bottom wall thereof and extending outwardly through one of said openings, a block of insulating material lying on said strap, a second strap overlying said block of insulating material and extending outwardly through the other opening, a single screw passing through said straps and said block to hold them together, and means for insulating said screw from one of said straps.

2. In combination, a base of insulating material, a cup resting on said base, said cup having opposed openings through the side, a strap lying in the cup on the bottom wall thereof and extending through one of said openings, a block of insulating material overlying said strap, a second strap overlying said block and extending through the other of said openings, the outer end of the second strap being bent downwardly and outwardly to bear against said base, a single screw extending through said straps and said block to hold them together, and means for insulating said screw from one of said straps.

3. A device comprising a cup of insulating material having opposed openings through the sides thereof, a strap lying in the cup on the bottom wall thereof and extending through one of said openings, a block of insulating material overlying said strap, a screw shell resting on said block of insulating material and having an opening registering with a second of the aforesaid openings in the cup, a second strap lying in the bottom of the shell and extending outwardly through the opening in the latter and the registering opening in the cup, a single screw extending through said straps, the block of insulating material and the bottom of said shell to connect them together, and means for insulating said screw from the second strap and from the shell.

4. A device comprising a cup of insulating material having opposed openings in the sides and closed at the bottom, there being a groove extending across the bottom of the cup on the outer side, a strap lying in the cup on the bottom and extending outwardly through one of said openings, a block of insulating material lying on said strap, a second strap overlying said block of insulating material and extending outwardly through the other of said openings, a single screw passing through said straps and said block of insulating material to hold them together, and means for insulating said screw from one of said straps.

In testimony whereof, I sign this specification.

ERNEST L. BRENK.